(12) United States Patent
Silva et al.

(10) Patent No.: US 9,016,766 B2
(45) Date of Patent: Apr. 28, 2015

(54) ENERGY DISSIPATION SYSTEM FOR VEHICLES

(71) Applicant: GM Global Technology Operations LLC, Detroit, MI (US)

(72) Inventors: Fabricio A. Silva, Sao Bernardo do Campo (BR); Ney Q. Pereira, Indaiatuba (BR)

(73) Assignee: GM Global Technology Operations LLC, Detroit, MI (US)

( * ) Notice: Subject to any disclaimer, the term of this patent is extended or adjusted under 35 U.S.C. 154(b) by 62 days.

(21) Appl. No.: 13/869,291

(22) Filed: Apr. 24, 2013

(65) Prior Publication Data

US 2014/0319873 A1 Oct. 30, 2014

(51) Int. Cl.
*B62D 25/08* (2006.01)
*B62D 21/15* (2006.01)
*B60R 19/02* (2006.01)

(52) U.S. Cl.
CPC .............. *B62D 21/152* (2013.01); *B60R 19/02* (2013.01)

(58) Field of Classification Search
USPC .................. 296/187.09, 203.02, 205, 193.09
See application file for complete search history.

(56) References Cited

U.S. PATENT DOCUMENTS

| 7,992,926 | B2 * | 8/2011 | Tamakoshi | 296/187.09 |
| 8,002,072 | B2 * | 8/2011 | Schmahl | 180/274 |
| 8,215,705 | B2 * | 7/2012 | Gonin | 296/187.09 |
| 8,651,559 | B2 * | 2/2014 | Kitaizumi | 296/187.09 |
| 2013/0207416 | A1 * | 8/2013 | Nagahori et al. | 296/187.09 |
| 2013/0249243 | A1 * | 9/2013 | Lee et al. | 296/187.03 |

* cited by examiner

*Primary Examiner* — Joseph D Pape
(74) *Attorney, Agent, or Firm* — Quinn Law Group, PLLC

(57) ABSTRACT

An energy dissipation system for a vehicle includes a frame having a front end and a rear end spaced apart from the front end along a longitudinal axis. The energy dissipation system also includes an energy absorber attached to the frame at the front end. The energy dissipation system further includes a stiffener attached to the frame at the front end and spaced apart from the energy absorber along a vertical axis that is substantially perpendicular to the longitudinal axis. The stiffener is tubular and defines a cavity therein.

17 Claims, 4 Drawing Sheets

ENERGY DISSIPATION SYSTEM FOR VEHICLES

TECHNICAL FIELD

The present disclosure relates to an energy dissipation system for a vehicle.

BACKGROUND

Vehicles, such as automotive vehicles, often include energy management devices configured for dissipating energy. For example, a front or rear bumper may absorb and dissipate energy to protect vehicle components from damage upon contact between the vehicle and an object external to the vehicle.

SUMMARY

An energy dissipation system for a vehicle includes a frame having a front end and a rear end spaced apart from the front end along a longitudinal axis. The energy dissipation system also includes an energy absorber attached to the frame at the front end. The energy dissipation system further includes a stiffener attached to the frame at the front end and spaced apart from the energy absorber along a vertical axis that is substantially perpendicular to the longitudinal axis. The stiffener is tubular and defines a cavity therein.

In one embodiment, the frame defines a plurality of indentations therein, and has an upper end and a lower end is spaced apart from the upper end along the vertical axis. Further, the stiffener is bolted to the frame at the front end and abuts the frame within the plurality of indentations. The stiffener is disposed between the upper end and the energy absorber along the vertical axis. The stiffener is tubular, has a central longitudinal axis, and defines the cavity therein along the central longitudinal axis. Further, the stiffener has a first portion having a first end configured for attachment to the frame, a second portion spaced opposite the first portion and having a second end configured for attachment to the frame, and a third portion integral with and interconnecting the first portion and the second portion such that the stiffener is substantially C-shaped. The stiffener is spaced apart from the energy absorber at a first distance of from about 200 mm to about 450 mm along the vertical axis.

In another embodiment, the third portion is curved and bows away from the vertical axis and the front end along the longitudinal axis. In addition, the stiffener is formed from steel, has a wall having a thickness of from about 0.5 mm to about 1.5 mm, and has a mass of from about 0.7 kg to about 0.9 kg.

The above features and advantages and other features and advantages of the present invention will be readily apparent from the following detailed description of the preferred embodiments and best modes for carrying out the present invention when taken in connection with the accompanying drawings and appended claims.

DETAILED DESCRIPTION

Figure 1:
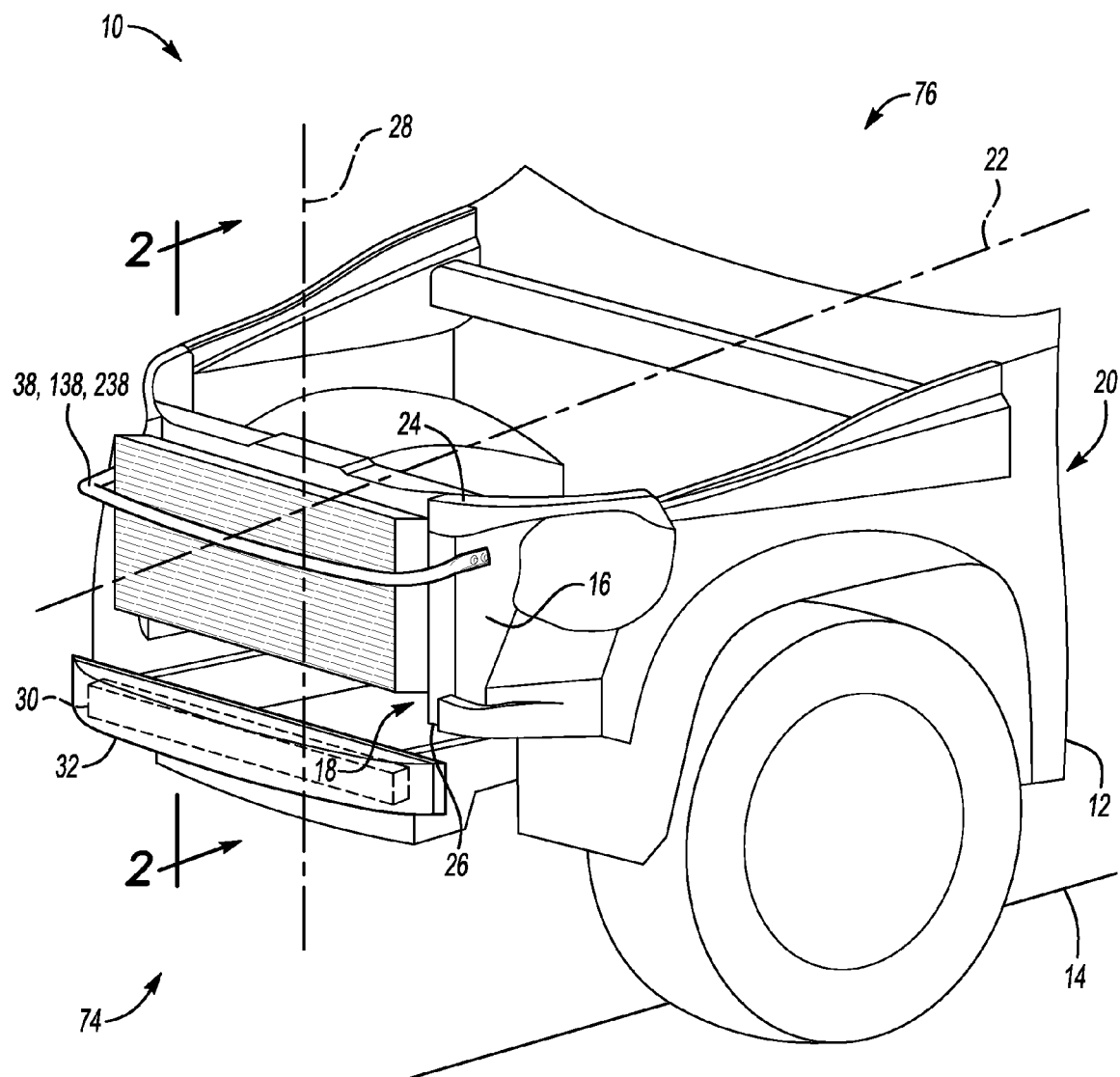
FIG. 1 is a schematic perspective illustration of an energy dissipation system for a vehicle.

Referring to the Figures, wherein like reference numerals refer to like elements, an energy dissipation system 10 for a vehicle 12 is shown generally in FIG. 1. The energy dissipation system 10 may be useful for vehicles 12, such as automotive vehicles, that may require protection from damage during contact between the vehicle 12 and an object (not shown) external to the vehicle 12. In particular, the energy dissipation system 10 may be useful for vehicles 12 translatable along a surface 14 and having a relatively high profile or height with respect to the surface 14, such as trucks, sport utility vehicles, and cargo or passenger vans. However, the energy dissipation system 10 may also be useful for non-automotive applications including, for example, recreational vehicle applications.

Referring to FIG. 1, the energy dissipation system 10 includes a frame 16 having a front end 18 and a rear end 20 spaced apart from the front end 18 along a longitudinal axis 22. Further, the frame 16 may have an upper end 24 and a lower end 26 spaced apart from the upper end 24 along a vertical axis 28 that is substantially perpendicular to the longitudinal axis 22. The frame 16 may be formed from any suitable material, such as, but not limited to, steel, and may support a body (not shown) and other components of the vehicle 12. As such, although not shown, the frame 16 may extend along substantially an entire length of the vehicle 12.

Referring again to FIG. 1, the energy dissipation system 10 also includes an energy absorber 30 attached to the frame 16 at the front end 18. The energy absorber 30 may be configured to deform, absorb energy, and thereby protect the vehicle 12 from damage during contact between the vehicle 12 and the object (not shown) external to the vehicle 12. For example, the energy absorber 30 may be formed from a foam, such as an expanded polypropylene foam, may have a density of about 30 grams per liter (g/L), and may be disposed within a front bumper (shown generally at 32 in FIGS. 1 and 2) of the vehicle 12. As used herein, the terminology "about" refers to a quantity that is within five percent of a stated quantity.

Figure 2:
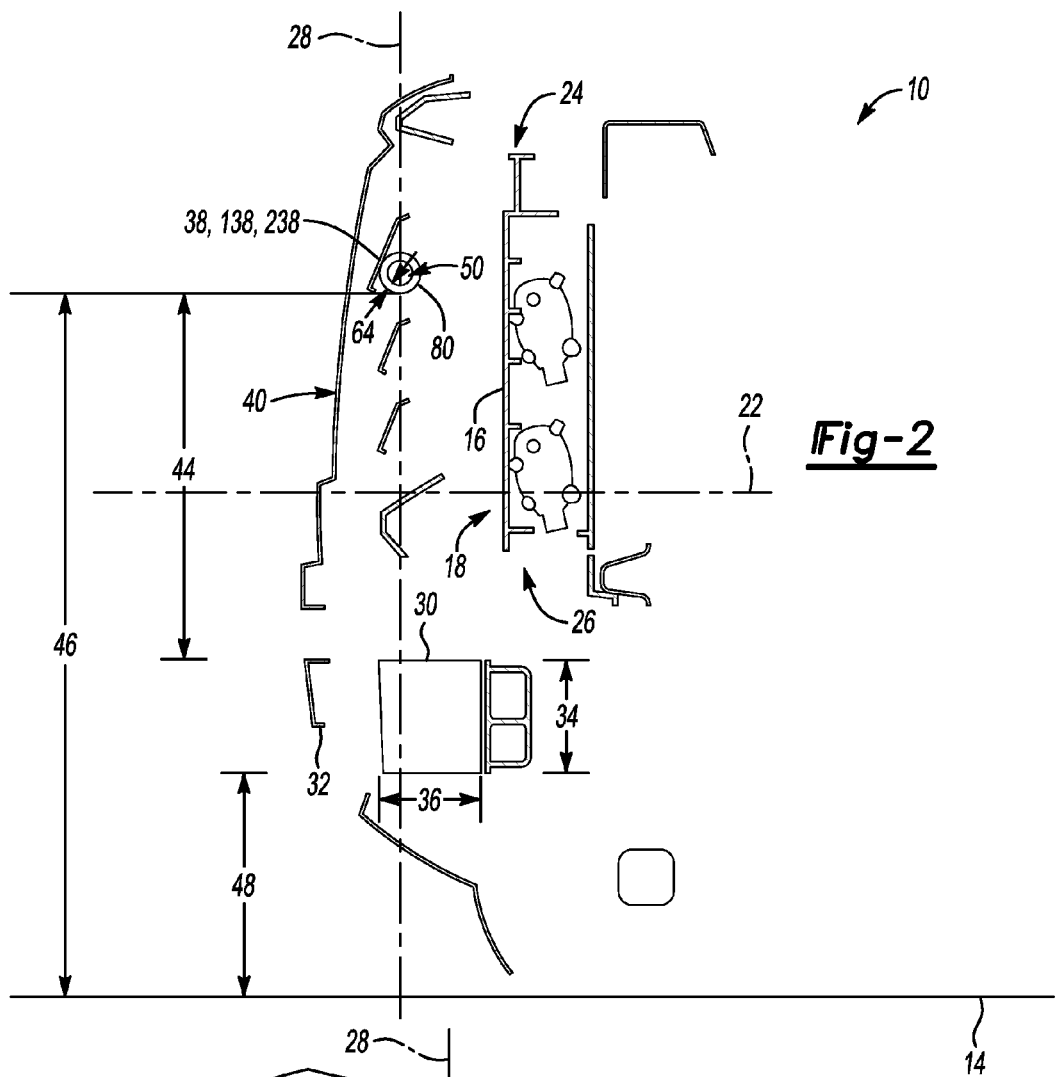
FIG. 2 is a schematic illustration of a cross-sectional view of the energy dissipation system of FIG. 1 taken along section lines 2-2.

With continued reference to FIG. 1, the energy absorber 30 may have any shape in accordance with a desired styling or body shape of the vehicle 12. In one non-limiting example, the energy absorber 30 may be shaped as a rectangular bar and extend along the front end 18 of the frame 16. That is, the energy absorber 30 may be substantially perpendicular to the longitudinal axis 22 and the vertical axis 28. Further, as best shown in FIG. 2, the energy absorber 30 may have a height 34 of from about 70 mm to about 130 mm, e.g., about 80 mm to about 120 mm, and a depth 36 of from about 60 mm to about 100 mm, e.g., about 70 mm to about 90 mm. In one specific example, the energy absorber 30 may have a height 34 of about 100 mm, and a depth 36 of about 90 mm.

Referring again to FIG. 1, the energy dissipation system 10 also includes a stiffener 38, 138, 238 attached to the frame 16 at the front end 18 and spaced apart from the energy absorber 30 along the vertical axis 28. The stiffener 38, 138, 238 may also be configured to protect the vehicle 12 from damage, e.g., during contact between the vehicle 12 and the object (not shown) external to the vehicle 12. In particular, the stiffener 38, 138, 238 may increase a stiffness of the energy absorber 30 and may dissipate energy during contact between the vehicle 12 and the object external to the vehicle 12. Further, the stiffener 38, 138, 238 may absorb energy and minimize intrusion of the object (not shown) into a front fascia (shown generally at 40 in FIG. 2) of the vehicle 12 during contact between the vehicle 12 and the object.

Figure 3:
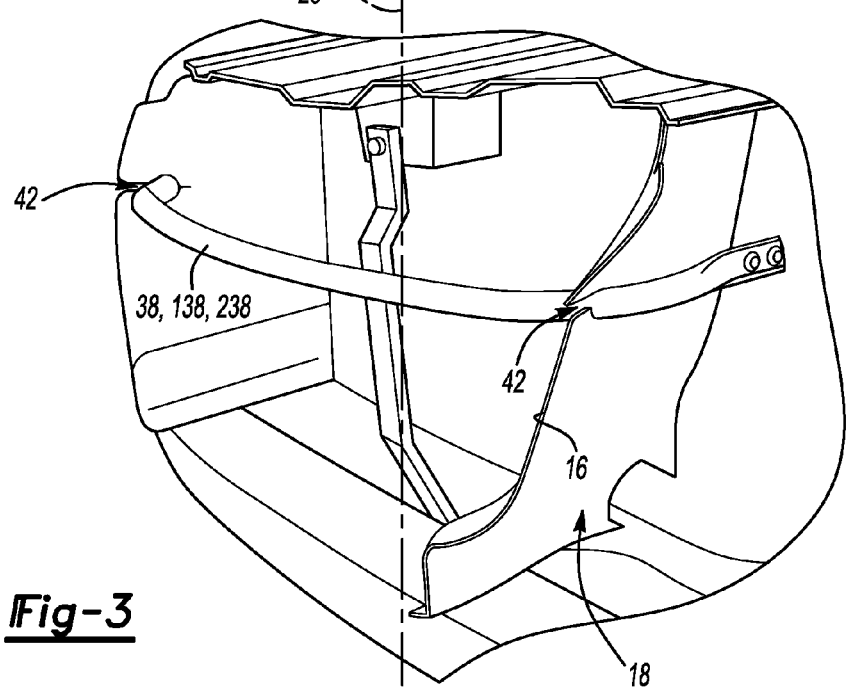
FIG. 3 is a schematic perspective illustration of a frame and a stiffener of the energy dissipation system of FIG. 1.

Referring now to FIG. 3, the stiffener 38, 138, 238 may be attached to the frame 16 in any suitable manner. For example, the stiffener 38, 138, 238 may be welded to the front end 18 of the frame 16. In another non-limiting example, the stiffener 38, 138, 238 may be bolted to the frame 16 at the front end 18. More specifically, as best shown in FIG. 3, the frame 16 may define a plurality of indentations 42 therein each configured for receiving and supporting the stiffener 38, 138, 238. That is, the stiffener 38, 138, 238 may abut the frame 16 within the plurality of indentations 42.

Therefore, as described with reference to FIGS. 1 and 2, the energy absorber 30 may be disposed between the surface 14 and the stiffener 38, 138, 238 along the vertical axis 28. That is, the stiffener 38, 138, 238 may be disposed above the energy absorber 30 along the vertical axis 28. More specifically, the stiffener 38, 138, 238 may be disposed between the upper end 24 and the energy absorber along the vertical axis 28. Conversely, the energy absorber 30 may be disposed beneath the stiffener 38, 138, 238 along the vertical axis 28. That is, the energy absorber 30 may be disposed between the stiffener 38, 138, 238 and the lower end 26.

In particular, as described with reference to FIG. 2, the stiffener 38, 138, 238 may be spaced apart from the energy absorber 30 at a first distance 44 of from about 200 mm to about 450 mm along the vertical axis 28. For example, the first distance 44 may be from about 240 mm to about 340 mm, or about 290 mm. Further, the stiffener 38, 138, 238 may be spaced apart from the surface 14 by a second distance 46 of from about 750 mm to about 870 mm along the vertical axis 28. For example, the second distance 46 may be from about 760 mm to about 860 mm, or about 810 mm. Moreover, the energy absorber 30 may be spaced apart from the surface 14 at a third distance 48 of from about 305 mm to about 460 mm, or about 425 mm, along the vertical axis 28.

Figure 4:
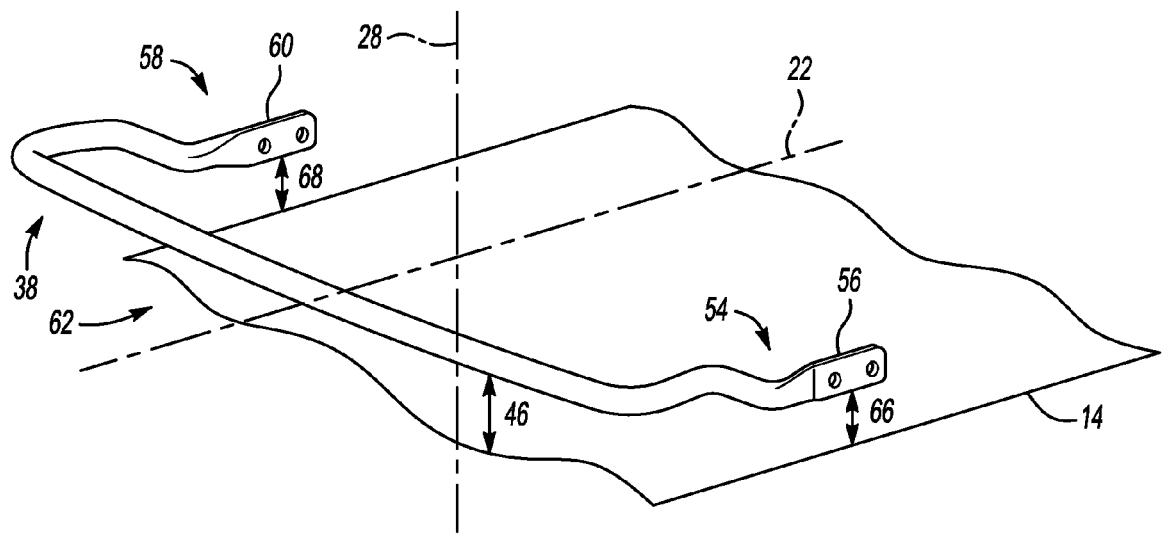
FIG. 4 is a schematic perspective illustration of one embodiment of the stiffener of FIG. 3.
Figure 5:
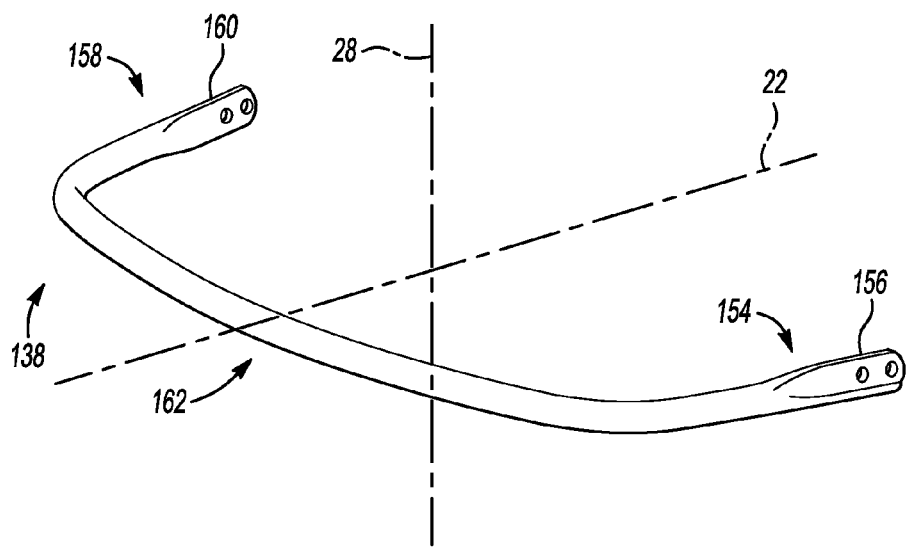
FIG. 5 is a schematic perspective illustration of another embodiment of the stiffener of FIG. 3.
Figure 6:
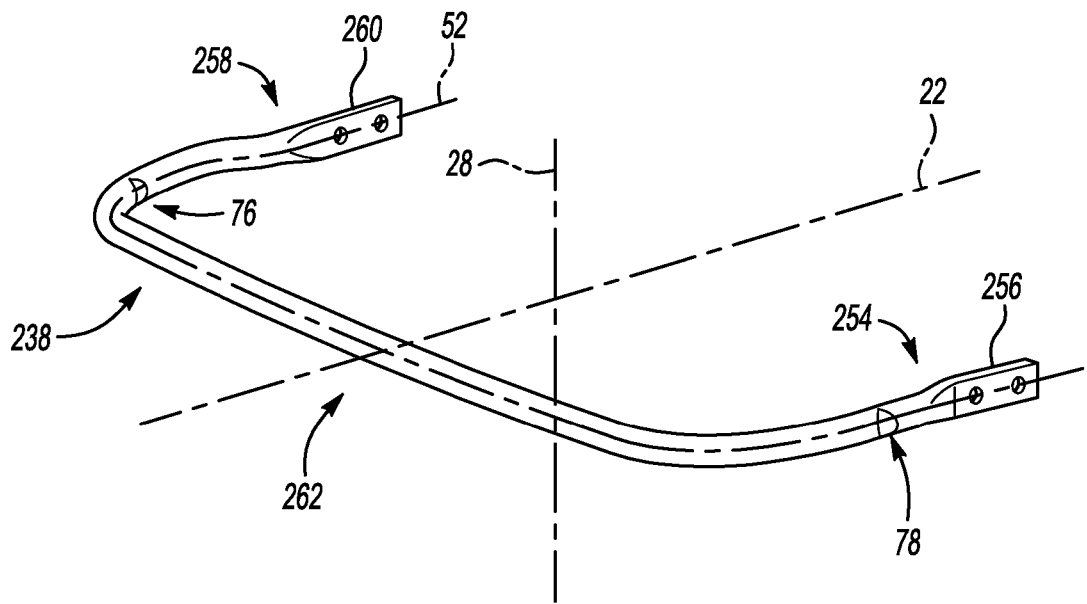
FIG. 6 is a schematic perspective illustration of a further embodiment of the stiffener of FIG. 3.

Referring now to FIGS. 4-6, the stiffener 38, 138, 238 is tubular and defines a cavity 50 (FIG. 2) therein. That is, the stiffener 38, 138, 238 may have a central longitudinal axis 52 (FIG. 6) and a hollow, circular cross-section (as best shown in FIG. 2), and may define the cavity 50 extending along the central longitudinal axis 52.

More specifically, with continued reference to FIGS. 4-6, the stiffener 38 (FIG. 4), 138 (FIG. 5), 238 (FIG. 6) may have a first portion 54, 154, 254 having a first end 56, 156, 256 configured for attachment to the frame 16 (FIG. 3), a second portion 58, 158, 258 spaced opposite the first portion 54, 154, 254 and having a second end 60, 160, 260 configured for attachment to the frame 16, and a third portion 62, 162, 262 integral with and interconnecting the first portion 54, 154, 254 and the second portion 58, 158, 258 such that the stiffener 38, 138, 238 may be substantially C-shaped. That is, the stiffener 38, 138, 238 may be a one-piece or integral element, and may be formed from any material having suitable stiffness and strength. For example, the stiffener 38, 138, 238 may be formed from steel. In particular, the stiffener 38, 138, 238 may be a welded, cold drawn steel tube formed according to international material specification EN10305-2 (DIN 2393), and may have a wall 80 (FIG. 2) having a thickness 64 (FIG. 2) of from about 0.5 mm to about 1.5 mm, e.g., about 1 mm. Further, the stiffener 38, 138, 238 may have a mass of from about 0.7 kg to about 1.3 kg, e.g., about 1 kg.

Referring now to FIGS. 4 and 6, in one non-limiting embodiment, the third portion 62, 262 may be substantially perpendicular to the longitudinal axis 22 and the vertical axis 28. That is, the third portion 62, 262 may be substantially straight.

Alternatively, referring to FIG. 5, in another non-limiting embodiment, the third portion 162 may be curved and may bow away from the vertical axis 28 and the front end 18 (FIG. 3) along the longitudinal axis 22 (FIG. 3). That is, for this embodiment, the third portion 162 may be curved. Such curvature of the third portion 162 may be selected according to desired vehicle styling and/or according to required energy absorption capabilities.

In a further non-limiting example, as described with reference to FIG. 4, the first portion 54 and the second portion 58 may have a stepped configuration. More specifically, when attached to the frame 16 (FIG. 1), the first end 56 may be spaced apart from the surface 14 at a fourth distance 66, and the second end 60 may be spaced apart from the surface 14 at a fifth distance 68 that is equal to the fourth distance 66 and less than the second distance 46. That is, as best shown in FIG. 4, the third portion 62 may not be coplanar with the first end 56 and the second end 60 so that the third portion 62 may be disposed in a different plane than the first and second ends 56, 60.

Figure 7:
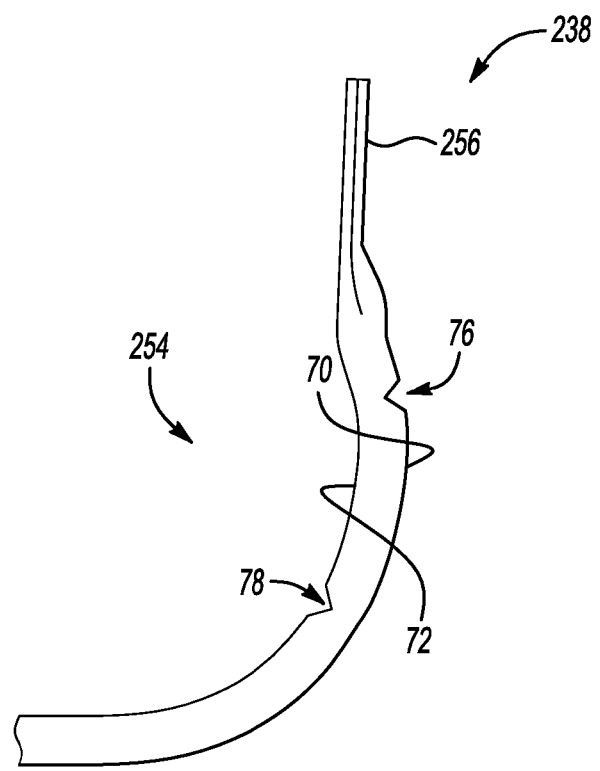
FIG. 7 is a schematic illustration of a plan view of a first end of the stiffener of FIG. 6.

Referring now to FIG. 7, the stiffener 238 may have a proximal surface 70 and a distal surface 72 spaced opposite the proximal surface 70. For example, the proximal surface 70 may face a front 74 (FIG. 1) of the vehicle 12 (FIG. 1), and the distal surface 72 may face a rear 76 (FIG. 1) of the vehicle 12 when the stiffener 238 is attached to the frame 16 (FIG. 1) at the front end 18 (FIG. 1). Further, the proximal surface 70 may define a first notch 76 therein. Similarly, the distal surface 72 may define a second notch 78 therein spaced apart from the first notch 76 along the central longitudinal axis 52 (FIG. 6). That is, the stiffener 238 may define a plurality of notches 74, 76 therein. For example, as best shown in FIG. 6, the first end 256 may define the first notch 76 and the second notch 78, and the second end 260 may also define a respective first notch 76 and second notch 78. The first notch 76 and the second notch 78 may have similar or different configurations, and may be spaced apart from one another along the central longitudinal axis 52 to provide the stiffener 238 with flexibility and/or a guide for deformation upon contact between the vehicle 12 and the object (not shown) external to the vehicle 12.

Therefore, the aforementioned energy dissipation system 10 and stiffener 38, 138, 238 may protect the vehicle 12 (FIG. 1) from damage during contact between the vehicle 12 and the object (not shown) external to the vehicle 12. That is, the stiffener 38, 138, 238, in conjunction with the energy absorber 30, may absorb and/or dissipate energy to protect vehicle components from damage and to minimize object intrusion into the front fascia 40 (FIG. 2) of the vehicle 12. Further, the stiffener 38, 138, 238 is lightweight and economical to manufacture and attach to the vehicle 12.

While the best modes for carrying out the present invention have been described in detail, those familiar with the art to which this invention relates will recognize various alternative designs and embodiments for practicing the invention within the scope of the appended claims.

The invention claimed is:

1. An energy dissipation system for a vehicle, the energy dissipation system comprising:

a frame defining a plurality of indentations therein and having:
a front end;
a rear end spaced apart from the front end along a longitudinal axis;
an upper end; and
a lower end spaced apart from the upper end along a vertical axis that is substantially perpendicular to the longitudinal axis;
an energy absorber attached to the frame at the front end; and
a stiffener bolted to the frame at the front end and spaced apart from the energy absorber along the vertical axis, wherein the stiffener abuts the frame within the plurality of indentations and is disposed between the upper end and the energy absorber along the vertical axis;
wherein the stiffener is tubular, has a central longitudinal axis, defines a cavity therein extending along the central longitudinal axis, and has:
a first portion having a first end configured for attachment to the frame;
a second portion spaced opposite the first portion and having a second end configured for attachment to the frame; and
a third portion integral with and interconnecting the first portion and the second portion such that the stiffener is substantially C-shaped;
wherein the third portion is curved and bows away from the vertical axis and the front end along the longitudinal axis;
wherein the stiffener is spaced apart from the energy absorber at a first distance of from about 200 mm to about 450 mm along the vertical axis; and
wherein the stiffener is formed from steel, has a wall having a thickness of from about 0.5 mm to about 1.5 mm, and has a mass of from about 0.7 kg to about 0.9 kg.

2. The energy dissipation system of claim 1, wherein the vehicle is translatable along a surface, and further wherein the energy absorber is disposed between the surface and the stiffener along the vertical axis.

3. The energy dissipation system of claim 2, wherein the stiffener is spaced apart from the surface at a second distance of from about 750 mm to about 870 mm along the vertical axis.

4. The energy dissipation system of claim 1, wherein the stiffener has a proximal surface and a distal surface spaced opposite the proximal surface, and further wherein the proximal surface defines a first notch therein.

5. The energy dissipation system of claim 4, wherein the distal surface defines a second notch therein spaced apart from the first notch along the central longitudinal axis.

6. The energy dissipation system of claim 1, wherein the third portion is substantially perpendicular to the longitudinal axis and the vertical axis.

7. The energy dissipation system of claim 1, wherein the first end is spaced apart from the surface at a fourth distance, and the second end is spaced apart from the surface at a fifth distance that is equal to the fourth distance and less than the second distance.

8. An energy dissipation system for a vehicle, the energy dissipation system comprising:
a frame defining a plurality of indentations therein and having:
a front end;
a rear end spaced apart from the front end along a longitudinal axis;
an upper end; and
a lower end spaced apart from the upper end along a vertical axis that is substantially perpendicular to the longitudinal axis;
an energy absorber attached to the frame at the front end; and
a stiffener bolted to the frame at the front end and spaced apart from the energy absorber along the vertical axis, wherein the stiffener abuts the frame within the plurality of indentations and is disposed between the upper end and the energy absorber along the vertical axis;
wherein the stiffener is tubular, has a central longitudinal axis, defines a cavity therein extending along the central longitudinal axis, and has:
a first portion having a first end configured for attachment to the frame;
a second portion spaced opposite the first portion and having a second end configured for attachment to the frame; and
a third portion integral with and interconnecting the first portion and the second portion such that the stiffener is substantially C-shaped;
wherein the third portion is curved and bows away from the vertical axis and the front end along the longitudinal axis;
wherein the stiffener has a proximal surface and a distal surface spaced opposite the proximal surface, and further wherein the proximal surface defines a first notch therein and the distal surface defines a second notch therein spaced apart from the first notch along the central longitudinal axis;
wherein the stiffener is spaced apart from the energy absorber at a first distance of from about 200 mm to about 450 mm along the vertical axis; and
wherein the stiffener is formed from steel, has a wall having a thickness of from about 0.5 mm to about 1.5 mm, and has a mass of from about 0.7 kg to about 0.9 kg.

9. The energy dissipation system of claim 8, wherein the vehicle is translatable along a surface, and further wherein the energy absorber is disposed between the surface and the stiffener along the vertical axis.

10. The energy dissipation system of claim 8, wherein the stiffener is spaced apart from the surface at a second distance of from about 750 mm to about 870 mm along the vertical axis.

11. The energy dissipation system of claim 10, wherein the first end is spaced apart from the surface at a fourth distance, and the second end is spaced apart from the surface at a fifth distance that is equal to the fourth distance and less than the second distance.

12. The energy dissipation system of claim 8, wherein the third portion is substantially perpendicular to the longitudinal axis and the vertical axis.

13. An energy dissipation system for a vehicle, the energy dissipation system comprising:
a frame defining a plurality of indentations therein and having:
a front end;
a rear end spaced apart from the front end along a longitudinal axis;
an upper end; and
a lower end spaced apart from the upper end along a vertical axis that is substantially perpendicular to the longitudinal axis;
an energy absorber attached to the frame at the front end; and
a stiffener bolted to the frame at the front end and spaced apart from the energy absorber along the vertical axis, wherein the stiffener abuts the frame within the plurality of indentations and is disposed between the upper end and the energy absorber along the vertical axis;

wherein the stiffener is tubular, has a central longitudinal axis, defines a cavity therein extending along the central longitudinal axis, and has:
- a first portion having a first end configured for attachment to the frame;
- a second portion spaced opposite the first portion and having a second end configured for attachment to the frame; and
- a third portion integral with and interconnecting the first portion and the second portion such that the stiffener is substantially C-shaped;
- wherein the third portion is curved and bows away from the vertical axis and the front end along the longitudinal axis;

wherein the stiffener is spaced apart from the energy absorber at a first distance of from about 200 mm to about 450 mm along the vertical axis;

wherein the stiffener is spaced apart from the surface at a second distance of from about 750 mm to about 870 mm along the vertical axis;

wherein the first end is spaced apart from the surface at a fourth distance, and the second end is spaced apart from the surface at a fifth distance that is equal to the fourth distance and less than the second distance; and wherein the stiffener is formed from steel, has a wall having a thickness of from about 0.5 mm to about 1.5 mm, and has a mass of from about 0.7 kg to about 0.9 kg.

14. The energy dissipation system of claim 13, wherein the vehicle is translatable along a surface, and further wherein the energy absorber is disposed between the surface and the stiffener along the vertical axis.

15. The energy dissipation system of claim 13, wherein the stiffener has a proximal surface and a distal surface spaced opposite the proximal surface, and further wherein the proximal surface defines a first notch therein.

16. The energy dissipation system of claim 15, wherein the distal surface defines a second notch therein spaced apart from the first notch along the central longitudinal axis.

17. The energy dissipation system of claim 13, wherein the third portion is substantially perpendicular to the longitudinal axis and the vertical axis.

\* \* \* \* \*